(12) United States Patent
Cachin

(10) Patent No.: US 7,327,847 B2
(45) Date of Patent: Feb. 5, 2008

(54) METHOD FOR DISTRIBUTED COMPUTATION OF RSA INVERSES IN ASYNCHRONOUS NETWORKS

(75) Inventor: Christian Cachin, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 10/768,933

(22) Filed: Jan. 30, 2004

(65) Prior Publication Data

US 2004/0254967 A1 Dec. 16, 2004

(30) Foreign Application Priority Data

Jan. 29, 2003 (EP) .................. 03405040

(51) Int. Cl.
*H04L 9/00* (2006.01)
(52) U.S. Cl. ...................... 380/286; 713/168
(58) Field of Classification Search ............ None
See application file for complete search history.

(56) References Cited

U.S. PATENT DOCUMENTS

2004/0117649 A1 * 6/2004 Whyte .................. 713/200

OTHER PUBLICATIONS

Catalano et al., "Computing inverses over a shared secret moduls," in Advances in Cryptology: EUROCRYPT 2000 (B. Preneel, ed.), vol. 1087 of Lecture Notes in Computer Science, pp. 190-206, Springer, 2000.*

* cited by examiner

*Primary Examiner*—Gilberto Barrón, Jr.
*Assistant Examiner*—Kristin D Sandoval
(74) *Attorney, Agent, or Firm*—Douglas Cameron, Esq.; Anne V. Dougherty

(57) ABSTRACT

The present invention discloses a method and system for distributed computation of an RSA inverse in an asynchronous network among participating network devices. The RSA inversion is self-verifiable and the result can be checked by every participating network device locally.

7 Claims, 3 Drawing Sheets

METHOD FOR DISTRIBUTED COMPUTATION OF RSA INVERSES IN ASYNCHRONOUS NETWORKS

TECHNICAL FIELD

The present invention is related to a method and system for distributed computation of an RSA inverse value in an asynchronous network among participating network devices.

DESCRIPTION OF PRIOR ART

RSA is the most widely used public-key cryptographic system today and uses an algorithm developed in 1977 by Ron Rivest, Adi Shamir, and Leonard Adleman. Methods for sharing an RSA key among a group of parties in a distributed system, and for using the key in a fault-tolerant way have therefore received considerable attention. They are the subject of threshold cryptography.

For example, it is well-known how to distribute an RSA signature scheme in synchronous networks among n parties such that a majority of them can securely issue signatures together, despite the fact that up to t may be faulty and misbehave in arbitrary, malicious ways. Given an RSA public key (N, e), where N is the product of two large primes, such schemes work by sharing the RSA "decryption exponent" $d = e^{-1} \bmod \phi(N)$ among the parties, where $\phi(\cdot)$ is the Euler function. To sign m, the parties jointly compute $\sigma$ such that $\sigma^e \equiv m \pmod{N}$. The values N, e, and d are chosen when the signature scheme is set up and remain unchanged afterwards.

Several RSA-based cryptosystems have been proposed, where e is given dynamically together with a value x, and the problem is to compute y such that $y^e \equiv x \pmod{N}$. This is also referred to as the RSA inversion problem. Catalano, Gennaro, and Halevi present in "Computing inverses over a shared secret modulus," in *Advances in Cryptology: EUROCRYPT 2000* (B. Preneel, ed.), vol. 1087 of *Lecture Notes in Computer Science*, pp. 190-206, Springer, 2000, a protocol that solves the problem in the threshold setting for synchronous networks. This protocol computes d as the modular inverse of e with the shared modulus $\phi(N)$, from which $y = x^d \bmod N$ is obtained.

Most threshold cryptographic protocols assume a synchronous network with a broadcast channel connecting all parties. Although this assumption is justified in principle by the existence of suitable clock synchronization and Byzantine agreement protocols that provide broadcast, the approach leads to rather expensive solutions in practice, for example, when deployed in wide-area distributed systems with only loosely synchronized clocks. These systems are also vulnerable to timing attacks.

Almost all known threshold RSA schemes require a synchronous network with broadcast; the only exception is a non-interactive signature scheme by V. Shoup, "Practical threshold signatures," in *Advances in Cryptology: EUROCRYPT 2000* (B. Preneel, ed.), vol. 1087 of *Lecture Notes in Computer Science*, pp. 207-220, Springer, 2000, which however makes crucial use of the random oracle model.

From the above it follows that there is still a need in the art for an improved computing of an RSA inverse in asynchronous distributed systems, consisting of n communicating parties linked only by point-to-point channels, where local clocks are not synchronized and no a priori bound on message delay exists. A practical and efficient asynchronous distributed RSA inversion scheme is therefore desired.

SUMMARY OF THE INVENTION

Disclosed is an efficient asynchronous scheme which allows to compute an RSA inverse y with respect to a public RSA modulus N whose factorization is secret and shared among a group of parties, herein also referred to as participating network devices. Given two input values x and e, the scheme computes y such that $y^e \equiv x \pmod N$. The disclosed scheme is attractive because it does not rely on Byzantine agreement; it leads to efficient asynchronous protocols for threshold signatures and for Byzantine agreement based on the strong RSA assumption, without the use of random oracles. The random oracle model allows to design practical cryptographic systems, but only yields heuristic evidence for their security. Using the scheme, one can obtain asynchronous threshold implementations of the RSA signature schemes which are based on the strong RSA assumption. These represent the first implementations of threshold signatures in asynchronous networks without random oracles.

The disclosed scheme for asynchronous distributed RSA inversion is quite practical, achieves resilience n>4t, and uses $O(n^3)$ messages and $O(n^3 K^2)$ communication, where K is a security parameter. Moreover, it is deterministic and does not rely on a randomized Byzantine agreement primitive, which would not only be more expensive but also preclude one of its applications: to implement randomized asynchronous Byzantine agreement using cryptography.

The scheme employs one distributed multiplication step like the synchronous RSA inversion protocol of Catalano et al. However, contrary to the generic approach of turning synchronous protocols with broadcast into asynchronous ones, the disclosed scheme does not need Byzantine agreement because RSA inversion is self-verifiable and the result can be checked by every participant, i.e. participating network device, locally.

In accordance with the present invention, there is provided a method for distributed computation of an RSA inverse value y in an asynchronous network from at least two input values x, e among n−1 participating network devices A, B, C comprising t<n/4 faulty devices and a non-faulty leader device D, the participating network devices A, B, C, D holding share values $\phi_A, \phi_B, \phi_C, \phi_D$ of the Euler function $\phi(N)$ of an RSA modulus N, each participating network device, with P=A, B, C, D performing the steps of:

(I) choosing a first random value q and a second random value r;

(II) sharing over integers $\mathcal{Z}$ the first random value q, the second random value r, and the zero value 0;

(III) the leader device D performing additionally the steps (i, ii) of:

(i) receiving a first, second, and third sub-share value $q_i, r_i, 0_i$ from at least t+1 participating network devices A, B, C, D;

(ii) broadcasting the identities S of said participating network devices A, B, C;

(IV) receiving the identities S and corresponding sub-share values $q_i, r_i, 0_i$;

(V) deriving a sum-share value F from the share value $\phi_P$, the at least one input value e, and the corresponding sub-share values $q_i, r_i, 0_i$ defined by the identities S, (VI) broadcasting the sum-share value F;

(VII) receiving 2t+1 sum-share values $F_i$;

(VIII) deriving a polynomial $f$ interpolating the sum-share values $F_i$ and an exponent share value $d_P$ dependent on the polynomial $f$, and an inverse-share value $y_P$ dependent on the exponent share value $d_P$ and the RSA modulus N;

(IX) broadcasting the inverse-share value $y_P$;

(X) receiving t+1 inverse-share value $y_i$; and (XI) obtaining the RSA inverse value y from the received inverse-share value $y_i$.

Further, at least t+1 participating network devices A, B, C, D can act as a leader device while performing n times the above mentioned steps. Among the n participating network devices A, B, C, D there are t<n/4 faulty devices assumed. By doing so no correct leader is necessary.

Each participating network device A, B, C, D can perform the following steps. In the event of obtaining or receiving one RSA inverse value y, the validity of the obtained RSA inverse value y under use of the at least two input values x, e can be determined, and in the event of positive determination, the RSA inverse value y is broadcast and further calculations are stopped. This allows an efficient execution of the method while a termination can be guaranteed.

The sharing over integers $\mathcal{Z}$ can use a threshold signature for determining the consistency of subsequently received sub-share values $q_i$, $r_i$, $0_i$ allows a faster termination of the scheme.

The sharing over integers $\mathcal{Z}$ can use a vector of digital signatures for determining the consistency of subsequently received sub-share values $q_i$, $r_i$, $0_i$ which also allows a faster termination of the scheme.

The Extended Euclidean Algorithm can be applied for deriving the exponent share value $d_P$, which from the practical point of view is efficient.

The RSA inverse value y can be obtained from the received inverse-share value $y_i$ by using the Lagrange Interpolation Algorithm, which is efficient.

BRIEF DESCRIPTION OF THE DRAWINGS

Preferred embodiments of the invention are described in detail below, by way of example only, with reference to the following schematic drawings.

The drawings are provided for illustrative purposes only.

DETAILED DESCRIPTION OF THE INVENTION

Figure 1:
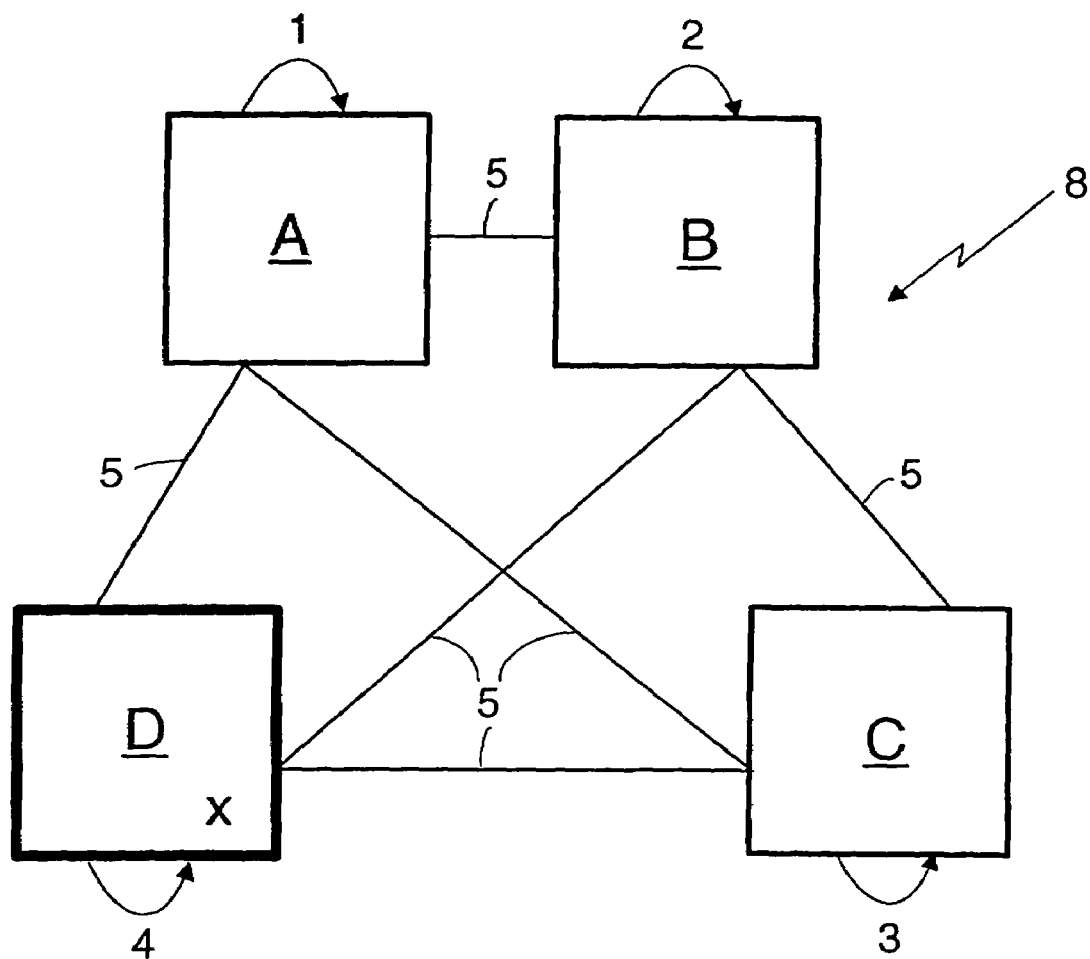
FIG. 1 shows a typical asynchronous network with multiple participating network devices and a distributor.

FIG. 1 shows an example of a common computer system 8, where a distributed computation of an RSA inverse value y can be performed. It consists of n=4 participating network devices A, B, C, and D which are connected via communication lines 5 to an asynchronous network. The system comprises here a dealer device D, which is designated by the "X". In a further embodiment, t+1 participating network devices may act as a leader device, as described in more detail below. Each participating network device A, B, C, D may be any type of computer device known in the art from a computer on a chip or a wearable computer to a large computer system. The communication lines can be any communication means commonly known to transmit data or messages from one participating network device A, B, C, D to another. For instance, the communication lines may be either single, bi-directional communication lines 5 between each pair of participating network devices A, B, C, D or one unidirectional line in each direction between each pair of participating network devices A, B, C, D. Such a computer system 8 and communication lines 5 are well known in the art. In the case where one participating network device A, B, C sends information to itself, an equivalent result could be achieved by merely moving data within the participating network device and not sending it over a communication line to itself. The common computer system 8 is shown to facilitate the description of the following distributed RSA inverse computation protocol. The same reference signs are used to denote the same or like parts. A method for distributed computation of an RSA inverse value y in an asynchronous network is described in the following together with some basic and further issues.

Figure 2:
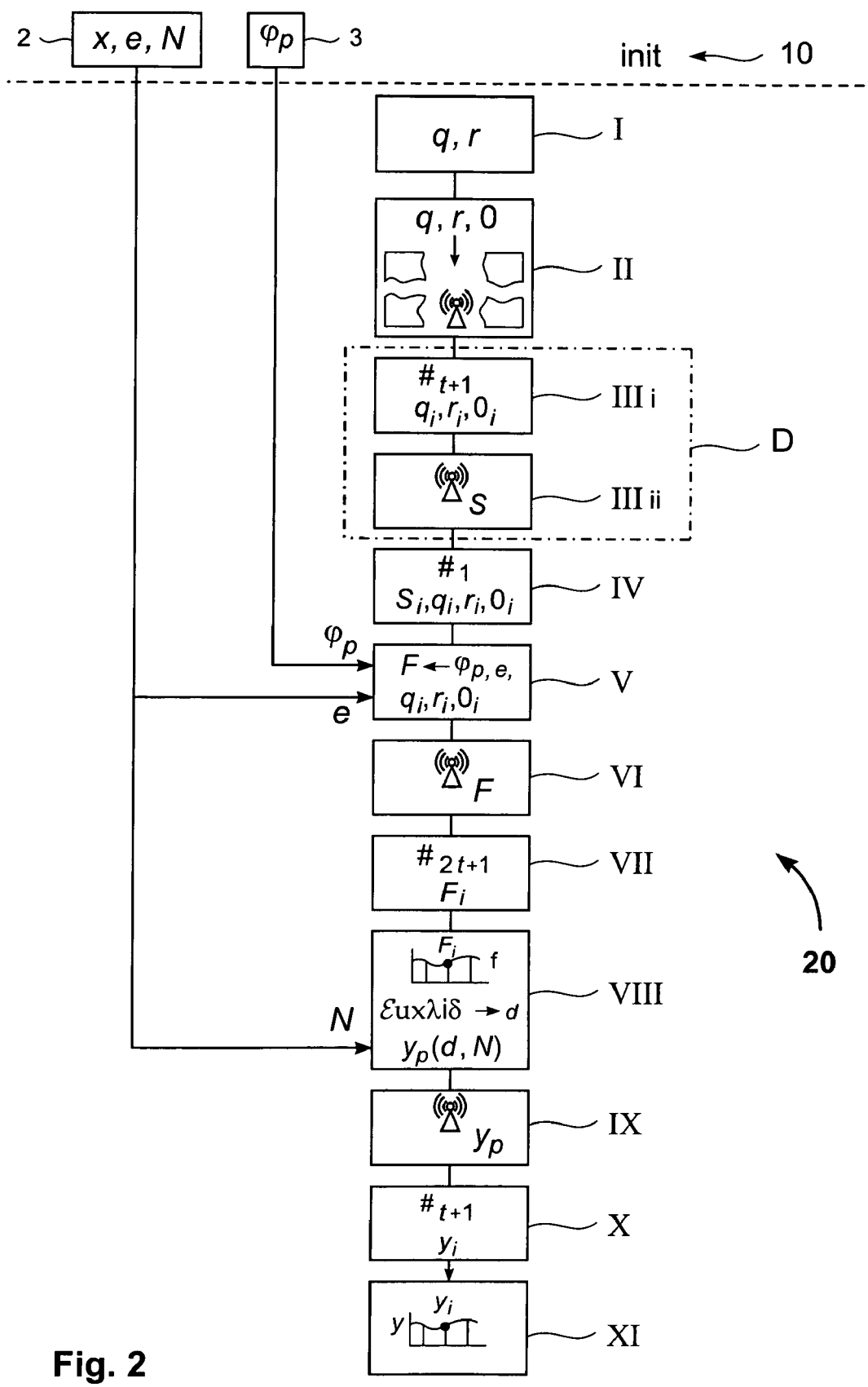
FIG. 2 shows a flow diagram for distributed computation of an RSA inverse value y in an asynchronous network.

FIG. 2 shows a flow diagram of a method 20 for distributed computation of an RSA inverse value y in an asynchronous network, from at least two input values x, e among n−1 participating network devices A, B, C comprising t<n/4 faulty devices and a non-faulty leader device D. The participating network devices A, B, C, D hold share values $\phi_A$, $\phi_B$, $\phi_C$, $\phi_D$ of the Euler function $\phi(N)$ of an RSA modulus N. In an initialization process 10, the two input values x, e, the RSA modulus N, and the share values $\phi_P$ are acquainted, as indicated in boxes 2 and 3, respectively. Each participating network device, with P=A, B, C, D, performs the following steps referenced with Roman numbers. At first, a first random value q and a second random value r are chosen, as indicated by box I. Then, in a sharing step, the first random value q, the second random value r, and the zero value 0 are shared over integers $\mathcal{Z}$, as indicated with box II.

The leader device D additionally receives a first, second, and third sub-share value $q_i$, $r_i$, $0_i$ from the at least t+1 participating network devices A, B, C, D and broadcasts the identities S of the participating network devices A, B, C, D, as indicated by the boxes IIIi and IIIii.

In a receiving step, the identities S and corresponding sub-share values $q_i$, $r_i$, $0_i$ are received as indicated with box IV. Then, a sum-share value F can be derived from the share value $\phi_P$, the input value e, and the corresponding sub-share values $q_i$, $r_i$, $0_i$ defined by the identities S, as indicated with box V. The sum-share value F is then broadcast, as indicated with box VI, whereby such a broadcast does not guarantee anything if the respective sender is faulty. Then, 2t+1 sum-share values $F_i$ are received, as indicated with box VII. A polynomial $f$ is derived, as indicated with box VIII, which interpolates the sum-share values $F_i$ and an exponent share value $d_P$ dependent on the polynomial $f$, and an inverse-share value $y_P$ dependent on the exponent share value $d_P$ and the RSA modulus N. The inverse-share value $y_P$ is then broadcast, as indicated with box IX, and t+1 inverse-share value $y_i$ are received as indicated with box X. Finally, the RSA inverse value y can be obtained from the received inverse-share value $y_i$, as indicated with box XI.

Figure 3:
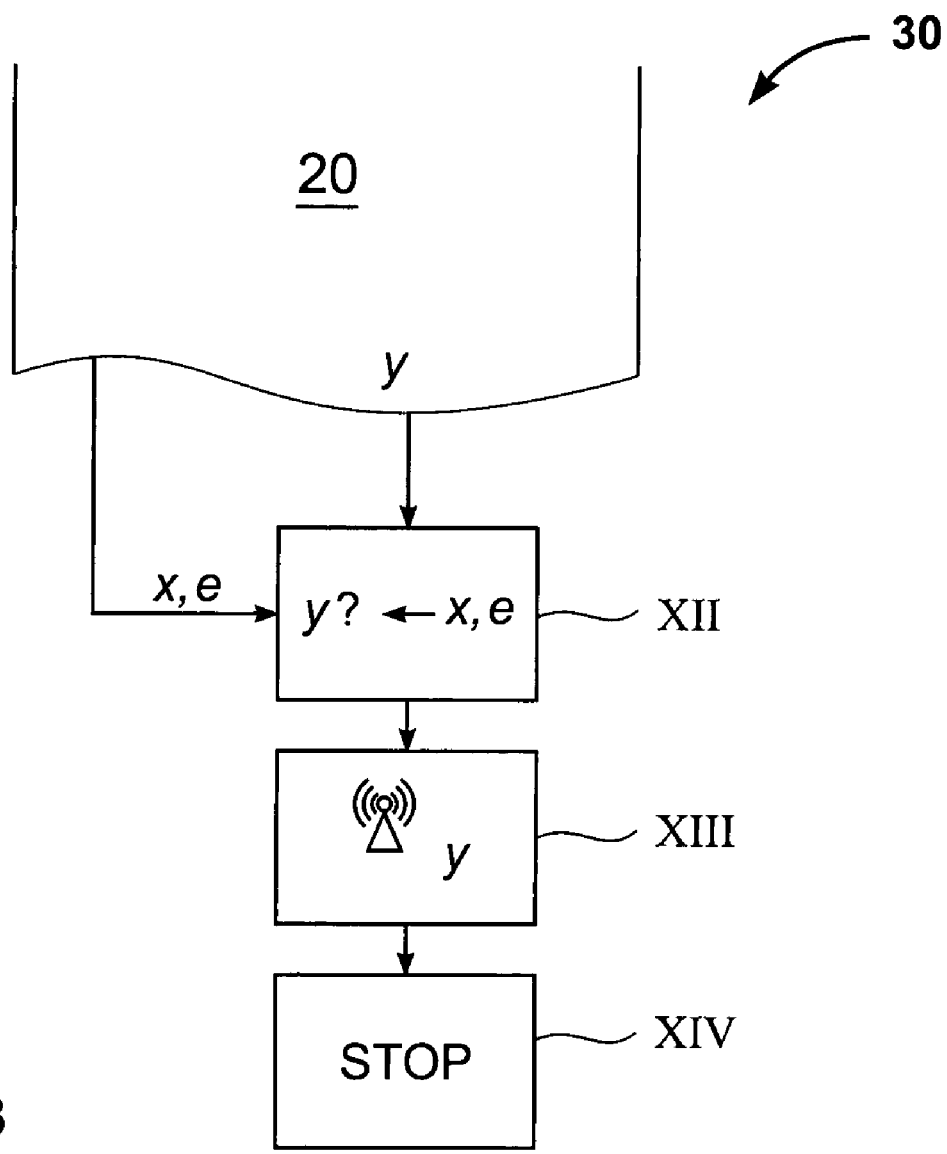
FIG. 3 shows a flow diagram with steps which each participating network device can perform when t+1 participating network devices act as a leader device.

FIG. 3 shows a flow diagram of a complete protocol 30 for distributed computation of an RSA inverse value y with steps for each participating network device to be executed when t+1 participating network devices act as a leader device. In this further embodiment at least t+1 participating network devices A, B, C, D act as the leader device while performing t+1 times the above-mentioned steps of the method 20. Then, with reference to FIG. 3, each participating network device A, B, C, D performs in the event of obtaining or receiving one RSA inverse value y a determination on the validity of the obtained RSA inverse value y under use of the at least two input values x, e, as illustrated with box XII.

In the event of positive determination the RSA inverse value y is broadcast, as indicated with box XIII, and all further calculations are stopped, as indicated with box XIV. This allows a termination of the protocol.

In order to facilitate the above-described steps some mathematical aspects are addressed in more detail below.

Cryptographic Assumptions

An RSA modulus N is the product of two primes of equal length. A safe prime $\pi$ is a prime such that $\pi-1/2$ is prime. A safe RSA modulus N is the product of two safe primes $\pi$ and Q, which comprise the secret key. The RSA operation is to compute $m^e$ for given m and e. The RSA inversion operation is to compute an RSA inverse value y such that $y^e=x$ mod N for given x and e; y is also called the RSA inverse of x and e.

Given a secret key $\phi(N)=(\pi-1)(Q-1)$, RSA inversion is easily carried out by computing $d=e^{-1}$ mod $\phi(N)$ and then raising x to the power d modulo N. The knowledge of $\phi(N)$ is equivalent to knowing the factorization of N. In the following it is shown how to compute this in an asynchronous distributed network where $\phi(N)$ is shared among the participating network devices A, B, C, D, hereafter also referred to as parties or $P_1, P_2, \ldots, P_n$, or each as party or $P_i$, or $P_j$.

Computing RSA Inverses with a Shared Secret Key

A (n, k)-sharing of a secret $\phi$ is an encoding of s into a set of shares $\phi_A, \phi_B, \phi_C, \phi_D$ such that any set of at least k shares uniquely defines $\phi$ and any set of less than k shares does not give information about $\phi$. Associated with a sharing is an efficient reconstruction algorithm that reconstructs $\pi$ from any set of k shares.

It is assumed that N is an RSA modulus. Suppose the participating network devices A, B, C, D, hold the shares of a (n, k)-sharing, as described in the previous paragraph, of the corresponding RSA secret key $\phi(N)$. The method 20 is hereafter also referred to as preliminary protocol 20, as there are messages sent forth and back between the parties. More precisely, the preliminary protocol 20 is an RSA inversion protocol with non-faulty leader device. The preliminary protocol 20 for RSA inversion of x and e, for some e>n, is started with input values e, N, x, $\phi_P$. One party terminates the protocol by generating an output value y. All non-faulty parties should be activated like this and all should output y such that $y^e \equiv x$ (mod N).

The preliminary protocol 20 for RSA inversion over N with a shared secret key $\phi(N)$ as described above satisfies the following conditions for any adversary and up to t faulty parties:

Termination: If all honest parties start the protocol all messages are delivered, then all honest parties eventually terminate the protocol.

Correctness: If an honest party terminates the protocol and outputs y, then $y^e \equiv x$ (mod N) except with negligible probability.

Privacy: The adversary gains no useful information about $\phi(N)$.

Weak Asynchronous Verifiable Secret Sharing

In weak asynchronous verifiable secret sharing, the agreement property of standard asynchronous verifiable secret sharing (AVSS) is relaxed as follows. When the dealer is faulty, some honest parties may terminate a weak AVSS protocol and others may not, but those who terminate hold consistent shares and are guaranteed that there are enough honest parties holding shares in order to reconstruct the secret. In contrast, AVSS guarantees that either all honest parties terminate the protocol successfully or none, which ensures agreement on the success of the sharing. This difference is analogous to the difference between consistent broadcast and reliable broadcast in asynchronous networks. An AVSS protocol is provided in the International Publication WO 02/087145 A1, entitled "Method of verifiably sharing a secret in potentially asynchronous networks", presently assigned to the assignee of the instant application and the disclosure of which is incorporated herein by reference.

The AVSS protocol is used many times as sub-protocol within the herein described RSA inversion protocol.

Dual-threshold sharings are considered in this paragraph, which generalize the standard notion of secret sharing by allowing the reconstruction threshold to exceed the number of corrupted parties by more than one. In an (n, k, t) dual-threshold sharing, there are n parties holding shares of a secret, of which up to t may be corrupted by an adversary, and any group of k or more honest parties may reconstruct the secret (n−t≧k>t). Such dual-threshold sharings are useful for distributed computation and agreement problems.

Secret Sharing over the Integers $\mathcal{Z}$

Polynomial secret sharing is usually done in a finite field, but it works also over $\mathcal{Z}$, provided that extra randomization is added. This is a well-known technique developed in the context of threshold RSA. Let L=n!. To share a secret s∈[0, M−1] over $\mathcal{Z}$ with security parameter K, choose k−1 random values $F_1, \ldots, F_{k-1}$ in $[-KL^2M, KL^2M]$ and let $f(z)=L(Ls+\Sigma_{i=1}^{k-1}F_iz^i)$. Denote the coefficients of the sharing polynomial $f$ by $f_0, f_1, \ldots, f_{k-1}$; they are divisible by L and their absolute value is bounded by $KL^3M$.

In the preliminary protocol 20, the shared secret is the first random value q with k=t+1 and M=K N and the second random value r with k=t+1 and $M=K^2N^2$, and the zero value 0 with k=2t+1 and $M=K^4L^3N^2$.

The share of $P_i$ is $f(i)$ for i=1, ..., n computed in $\mathcal{Z}$. It is easy to see that these values form a (n, k)-sharing because $Ls=\Sigma_{i\in S}\lambda_i^S f(i)$ for any $S \subset \{1, \ldots, n\}$ of cardinality k, where $\lambda_i^S=\Pi_{j\in S\setminus\{i\}}-j/i-j$ are the Lagrange interpolation coefficients for S and position 0. This can be computed in $\mathcal{Z}$ because every $\Pi_{j\in S\setminus\{i\}}(i-j)$ divides i! (n−i)!, which divides n!=L.

Protocol for Weak AVSS Over the Integers $\mathcal{Z}$

A protocol for weak AVSS comprises a secret sharing method with verification over the integers to achieve robustness based on the strong RSA assumption in $\mathcal{Z}_N$.

Let K be a security parameter, N a safe RSA modulus, g and h two random squares in $\mathcal{Z}^*_N$ and s∈[0, M−1] the secret to share.

The dealer of the weak AVSS protocol first computes (n, k, t)-sharings of s and of a random $s_0 \in \mathcal{Z}_M$ over the integers, defining two sharing polynomials $f$ and $f'$, respectively. It also computes verification values $C_j=g^{f_j}h^{f'_j}$ mod N for j=0, ..., k−1, where $f_j$ and $f'_j$ denote the coefficients of $f$ and $f'$.

The communication follows the approach of "echo broadcast", also referred to as "consistent broadcast", with a non-interactive (n, m, t) threshold signature scheme for m=max{k, n+t+1/2}. Recall that such a signature scheme tolerates up to t corrupted parties and requires m valid signature shares for assembling the threshold signature. First, the dealer sends a share of the secret to all parties and every party answers with a threshold signature share if the share is valid. Then, upon receiving m threshold signature shares, the dealer computes the threshold signature and sends it to all parties. Finally, a party accepts the sharing when it has a valid share and receives a valid threshold signature.

The protocol for weak AVSS allows to share multiple secrets s, s', ... in parallel with the same dealer in sharings with reconstruction thresholds k, k', .... All properties are satisfied if the reconstruction threshold m of the threshold signature scheme is set to m=max {k, k', ..., n+t+1/2}. This not only decreases message and computation complexities compared to separate executions of the sharing protocol, but ensures also that every honest party holding a share of s holds also a share of s', ....

The RSA Inversion Protocol with Non-Faulty Leader

The preliminary protocol 20 is contemplated to work with a correct leader. It tolerates crashes and a passive adversary. That is, all parties apart from the leader may crash and collude to gain knowledge about the secret, but otherwise they follow the protocol. The preliminary protocol 20 uses the approach of the synchronous protocol for computing modular inverses by Catalano et al., to obtain a sharing of $d = e^{-1} \bmod \phi(N)$. Given the shared d, the result $y = x^d \bmod N$ can be reconstructed.

The preliminary protocol 20 is hereafter described more mathematically. The input of every $P_i$ includes e, N, x, and, $\phi_i$ where $\phi_i$ is $P_i$'s share of $\phi = \phi(N)$ in a (n, t+1, t)-sharing over $\mathcal{Z}_N$, using a polynomial $S(z) = L(L\phi + \Sigma_{j=1}^t a_j z^j)$ for $a_{j \leftarrow R} [-KL^2N, KL^2N]$. Let $N \geq K \geq L^2$ and $K > e > n$.

The parties first compute a K-random (n, t+1, t)-sharing of a random $Q_0 \in [0, KN-1]$, an analogous sharing of a random $R_0 \in [0, K^2N^2-1]$, and a K-random (n, 2t+1, t)-sharing of $0 \in [0, K^4L^3N^2-1]$. These sharings are executed in parallel as mentioned above in the protocol to share multiple secrets and define integer polynomials Q(z) and R(z) of degree t and H(z) of degree 2t. The shares of $P_i$ are Q(i), R(i), and H(i).

Next, the parties obtain a sharing of F(0) for F(z)=S(z)Q(z)+eR(z)+H(z) by local multiplication and addition of shares only, and collaboratively reconstruct $F(0) = L^4 \phi Q_0 + L^2 eR_0$. Every party applies the extended Euclidean algorithm to compute locally a and b such that aF(0)+be=1, which works if gcd(F(0), e)=1. Then, $d = aL^2R_0 + b$ is the inverse of e modulo $\phi$, as is easy to verify. However, d is not reconstructed since this would reveal $\phi$ and the factorization of N. Instead, $P_i$ computes a share of d as $d_i = aL^2R(i) + b$ using its share of $R_0$; then it reveals $y_i = x^{d_i}$. From t+1 such $y_i$, the result $y \equiv x^d \pmod{N}$ can be recovered.

So far the description parallels the work of Catalano et. al., but the difference is in the computation of the sharings. Q(z) is the sum of up to n sharing polynomials $Q_i(z)$ with dealer $P_i$. The problem that arises is that all parties should arrive at the same Q(z). In the synchronous model with broadcast, agreement on faulty parties $P_j$ who did not properly share a polynomial is immediately available. In the asynchronous system, this is not the case, so a single party is used, the leader, to choose a set S of parties whose sharings should be combined; this works because of the assumption that the leader is correct. Thus, Q(z) is set to $\Sigma_{i \in S} Q_i(z)$, and R(z) and H(z) are computed in the same way.

The RSA Inversion Protocol

This section relates to the complete protocol 30 for distributed computation of an RSA inverse value y, also referred to as complete protocol 30, which is also robust, i.e., tolerates Byzantine faults. The complete protocol 30 comprises the preliminary protocol 20 for RSA inversion with non-faulty leader device.

The preliminary protocol 20 is designed to be robust, still under the assumption that $P_i$ is honest. The AVSS sub-protocol yields a commitment vector C to its sharing polynomial. Let $C_S$ denote such a commitment to the polynomial used to share $\phi$, corresponding to the share $S_i$ of $P_i$, and assume $C_S$ is made available initially to every party. Let $C_{Qj}$, $C_{Rj}$ and $C_{Hj}$ for $j \in [1, n]$ denote the commitments resulting from the weak AVSS sub-protocols invoked by the preliminary protocol 20.

The weak AVSS sub-protocol is already robust and the message may remain unchanged. However, additional steps are used in the inversion protocol to prevent honest parties receiving sum-share value F and inverse-share value $y_P$ with incorrect data. Since these are point-to-point messages, the standard two-party techniques for proving statements about relations modulo a composite N are sufficient; this works under the strong RSA assumption.

For the message comprising the sum-share value F, the sender P carries out a zero-knowledge proof of knowledge with every receiver that F has been computed correctly with respect to $C_S$, $C_{Qj}$, $C_{Rj}$, and $C_{Hj}$ for $j \in S$. The receiver receives the message only if the proof is correct.

For the message comprising inverse-share value $y_P$, the sender P carries out a zero-knowledge proof of knowledge with every receiver that $y_P$ has been computed correctly with respect to a, b, and $C_{Rj}$ for $j \in S$ (the receiver uses its own values a and b computed upon receiving messages). The receiver accepts the message only if the proof is correct.

It remains to show how to cope with a corrupted leader $P_l$. For that, the preliminary protocol 20 is run t+1 times in parallel with different leaders, which guarantees that at least one leader is honest and the corresponding protocol terminates. As soon as a party terminates the first parallel protocol instance with the correct result, it sends the result to all other parties, aborts the remaining instances, and halts. Every party who receives the correct result like this also aborts all inversion protocols. Note that every party may verify that a claimed result y is correct by checking that $y^e \equiv x \pmod{N}$.

This works because the RSA inversion operation is deterministic and the result is self-verifiable; thus, all protocol copies output the same result for all parties and every party can check locally that the output is correct if they receive the result from another party.

Application: Threshold RSA Signatures

Standard RSA signatures can be proved secure only in the random oracle model. Random oracles are a heuristic tool to analyze the security of cryptographic primitives by pretending that a hash function is implemented by a distributed oracle, which answers with a random value for every distinct point on which it is queried. They are used because the cryptographic systems in this model are typically more efficient than the corresponding systems in the standard model, where proofs must be based only on intractability assumptions.

Two related RSA signature schemes that avoid the random oracle model have been proposed recently. One was presented by R. Gennaro, S. Halevi, and T. Rabin in their article "Secure hash-and-sign signatures without the random oracle," in *Advances in Cryptology: EUROCRYPT '99* (J. Stem, ed.), vol. 1592 of *Lecture Notes in Computer Science,* Springer, 1999, and the second one by R. Cramer and V. Shoup presented in the article "Signature schemes based on the strong RSA problem," *ACM Transactions on Information and System Security,* vol. 3, no. 3, pp. 161-185, 2000.

Both rely on the "strong RSA assumption" and involve the RSA-inversion of an element x with a fresh e for every signature. These schemes can be implemented in a distributed system using threshold cryptography by sharing φ(N) and carrying out a distributed RSA inversion protocol, as shown by Catalano et al. for synchronous systems.

In both schemes, the public key contains the safe RSA modulus N, and the signature generation comprises the computation of an RSA inverse of a value x and a value e that are derived from the public key, from the message to be signed, and from random choice. Using the complete protocol 30, the first efficient implementations of RSA threshold signatures in asynchronous networks works as follows.

Suppose there is a distinguished party $P_S$ who serves as a gateway for signature requests from clients and starts the instance of the distributed signature protocol. Party $P_S$ is assumed to be honest and not to crash. Given the message, both signature schemes are deterministic apart from the initial choice of one random value, and the only distributed computation is the RSA inversion.

Thus, a possible protocol for asynchronous RSA threshold signatures proceeds as follows. First, the parties compute a random value using the standard approach: Every party shares a random secret using AVSS, the distinguished party $P_S$ announces a subset S of t+1 parties whose sharings have terminated successfully, all parties together reconstruct the secrets indicated by S, and every party adds the reconstructed secrets. The result is the desired random value, which is needed in both signature schemes. Second, the parties carry out the complete protocol 30 for RSA inversion. Finally, every party computes the signature and outputs it.

In absence of an honest $P_S$, the sketched protocol is run t+1 times in parallel; this may result in up to t+1 different signatures on the same message, which is unlikely to cause problems in most applications.

Application: Verifiable Random Functions and Byzantine Agreement

A verifiable random function (VRF) is a pseudo-random function that provides a non-inter-actively verifiable proof for the correctness of its output. A pseudo-random functions $f_s$ with a secret seed s maps κ-bit strings to λ-bit strings; its output is computationally indistinguishable from a random function for any polynomial-time observer. S. Micali, M. Rabin, and S. Vadhan in "Verifiable random functions," in *Proc. 40th IEEE Symposium on Foundations of Computer Science (FOCS)*, 1999, formalized the notion of a verifiable random function: given an input and knowledge of the seed s allows to compute v together with a unique verification value or "proof". This proof convinces every verifier of the fact that v with respect to the given public key of the VRF. A difficulty is that the proof should not reveal anything about $f_s$ on inputs different from x.

A VRF construction is based on the unpredictability of the RSA inversion operation, but the construction is too complex to describe here. In order to obtain a threshold verifiable random function in asynchronous networks, only the RSA inversion step should be distributed; all other operations are deterministic, given the public key and the shared initialization data of the scheme.

The complete protocol 30 for RSA inversion yields the first threshold VRF based on RSA, the strong RSA assumption, to be precise, which is also efficient, i.e., not based on generic multi-party computation methods. The VRF construction executes a sequence of RSA inversions; the asynchronous distributed implementation succeeds without using a Byzantine agreement primitive since every inversion operation is self-verifiable, as is the final VRF output.

An interesting application of this threshold VRF is to implement asynchronous Byzantine agreement by using the VRF as a common coin sub-protocol. Thus, the inversion protocol yields also an efficient cryptographic asynchronous Byzantine agreement protocol under the strong RSA assumption, and without random oracles.

Asynchronous Byzantine agreement protocols rely on randomization, which can be implemented by the mentioned common coin protocols. In modem cryptography, such a common coin is known as an unpredictable threshold pseudo-random function. So far, all efficient implementations of this primitive have relied on the random oracle model or on synchronous networks and broadcast channels.

Any disclosed embodiment may be combined with one or several of the other embodiments shown and/or described. This is also possible for one or more features of the embodiments.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for distributed computation of an RSA inverse value (y) for asynchronous authentication for communication of encrypted messages in an asynchronous network for at least two input values (x, e) among n−1 participating network devices compromising t<n/4 faulty devices and a non-faulty leader device, the participating network devices holding share values of the Euler function (μ(N)) of RSA modulus (N), each participating network device performing the steps of:

a. choosing a first random value (q) and a second random value (r);

b. sharing over integers (Z) the first random value (q), the second random value (r), and the zero value (0);

c. the leader device performing additionally the steps of:

i. receiving a first, second, and third sub-share value ($q_i$, $r_i$, $0_i$,) from at least t+1 participating network devices;

ii. broadcasting identities of said participating network devices;

d. receiving the identities and corresponding sub-share values ($q_i$, $r_i$, $0_i$,);

e. deriving a sum-share value (F) from one of the sub-share values, the at least one input value (e), and the corresponding first, second and third sub-share values ($q_i$, $r_i$, $0_i$,) defined by the identities;

f. broadcasting the sum-share values (F);

g. receiving 2t+1 sum-share values ($F_i$);
h. deriving a polynomial ($f$) interpolating the sum-share values ($F_i$) and an exponent share value ($d_p$) dependent on the polynomial ($f$), and an inverse-share value ($y_p$) dependent on the exponent share value ($d_p$) and the RSA modulus (N);
i. broadcasting the inverse-share value ($y_p$);
j. receiving t+1 inverse share values ($y_i$);
k. verifying the validity of the received values for authenticating participating network devices by obtaining the RSA inverse value (y) from the received inverse-share values ($y_i$), determining the validity of the obtained RSA inverse value (y) using at least two input values (x, e,), and, in the event of a positive determination, broadcasting the RSA inverse value (y), and stopping further calculations; and
l. applying the derived exponent share values for encryption of communications with authenticated participating network devices.

2. A method according to claim 1 to compute the RSA inverse value (y), wherein among n participating network devices (A, B, C, D) compromising t<n/4 faulty devise at least t+1 participating network devices (A, B, C, D) act as a leader device while performing n times the steps of claim 1.

3. A method according to claim 1, wherein the step (b) of sharing over integers (Z) comprises using a threshold signature for determining the consistency of subsequently received sub-share values ($q_i$, $r_i$, $0_i$).

4. A method according to claim 1, wherein step (b) of sharing over integers (Z) comprises using a vector of digital signatures for determining the consistency of subsequently received sub-share values ($q_i$, $r_i$, $0_i$).

5. A method according to claim 1, wherein step (h) of deriving an exponent share value ($d_p$) comprises using the Extended Euclidean Algorithm.

6. A method according to claim 1, wherein the step (k) of obtaining the RSA inverse value (y) from the received inverse-share value ($y_i$) comprises using the Lagrange Interpolation Algorithm.

7. A plurality of program storage devices, each readable by at least one digital processing apparatus and having a program of instructions which are tangibly embodied in the storage devices and which are executable by at least one processing apparatus to perform a method for distributed computations of an RSA inverse value (y), for asynchronous authentication for communication of encrypted messages in an asynchronous network from at least two input values (x, e) among n−1 participating network devices (A, B, C, D) holding share values ($\mu_A$, $\mu_B$, $\mu_C$, $\mu_D$) of the Euler function ($\mu(N)$) of an RSA modulus (N), said program allowing each participating network to perform the following steps:
a. choosing a first random value (q) and a second random value (r);
b. sharing over integers (Z) the first random value (q), the second random value (r), the zero value (0);
c. the leader device (D) performing additionally the steps of:
  i. receiving a first, second, and third sub-share value ($q_i$, $r_i$, $0_i$) from at least t+1 participating network devices;
  ii. broadcasting identities (S) of said participating network devices
d. receiving the identities (S) and corresponding sub-share values ($q_i$, $r_i$, $0_i$);
e. deriving a sum-share value (F) from the sub-share value (p), the at least one input value (e), and the corresponding sub-share values ($q_i$, $r_i$, $0_i$) defined by the identities (S),
f. broadcasting the sum-share value (F);
g. receiving 2t+1 sum-share values ($F_i$);
h. deriving a polynomial ($f$) interpolating the sum-share values ($F_i$) and an exponent share value ($d_p$) dependent on the polynomial ($f$) and an inverse-share value ($y_p$) dependent on the exponent share value ($d_p$) and the RSA modulus (N);
i. broadcasting the inverse-share value ($y_p$);
j. receiving t+1 inverse-share values ($y_i$);
k. verifying the validity of the received values for authenticating participating network devices by obtaining the RSA inverse value (y) from the received inverse-share values ($y_i$), determining the validity of the obtained RSA inverse value (y) using at least two input values (x, e,), and, in the event of a positive determination, broadcasting the RSA inverse value (y), and stopping further calculations; and
l. applying the derived exponent share values for encryption of communications with authenticated participating network devices.

* * * * *